United States Patent [19]

Roland et al.

[11] Patent Number: 4,929,684

[45] Date of Patent: May 29, 1990

[54] STIFF SIDEWALLS FOR PNEUMATIC TIRES

[75] Inventors: Charles M. Roland, Waldorf, Md.; Georg G. A. Bohm; Steven E. Schonfeld, both of Akron, Ohio

[73] Assignee: Bridgestone/Firestone, Inc., Akron, Ohio

[21] Appl. No.: 207,845

[22] Filed: Jun. 17, 1988

[51] Int. Cl.$^5$ .................... C08K 5/09; C08L 7/00; C08L 9/00

[52] U.S. Cl. ..................... 525/274; 152/525; 525/161; 525/163

[58] Field of Search ............... 525/274, 302, 263, 238, 525/261; 524/35; 152/525

[56] References Cited

U.S. PATENT DOCUMENTS

| | | | |
|---|---|---|---|
| 3,823,122 | 7/1974 | Schuh et al. | 260/85.1 |
| 3,873,348 | 3/1975 | Reilly et al. | 524/35 |
| 4,056,269 | 11/1977 | Pollitt et al. | 273/218 |
| 4,065,537 | 12/1977 | Miller et al. | 264/143 |
| 4,082,288 | 4/1978 | Martin et al. | 273/218 |
| 4,191,671 | 3/1980 | Kotaoka et al. | 260/23.7 M |
| 4,192,790 | 3/1980 | McKinstry et al. | 260/31.2 MR |
| 4,213,409 | 12/1980 | Hayes et al. | 525/274 |
| 4,266,772 | 5/1981 | Martin et al. | 273/218 |
| 4,495,326 | 1/1985 | Donatelli et al. | 524/533 |
| 4,500,466 | 2/1985 | Hayes et al. | 260/429.9 |
| 4,529,770 | 7/1985 | Hayes et al. | 524/445 |
| 4,659,754 | 4/1987 | Edwards et al. | 524/35 |
| 4,720,526 | 1/1988 | Roland | 525/273 |

Primary Examiner—Allan M. Lieberman
Attorney, Agent, or Firm—Frank J. Troy, Sr.

[57] ABSTRACT

Sidewalls (12,13) for pneumatic tires (10) having a greater stiffness improve handling and performance of the tire. The sidewalls comprise a rubber, selected from the group consisting of natural rubber, synthetic rubber and blends thereof, and from about 20 to 80 parts of a rubber compatible additive, per 100 parts of rubber capable of imparting a tensile modulus of from about 30 to 200 MPa at 10 percent elongation. Pneumatic tires provided with such sidewalls are improved and exhibit higher cornering force coefficients. A method for improving the handling characteristics of pneumatic tires includes the step of applying sidewalls to the tire carcass during building, having a tensile modulus of from about 30 to 200 MPa at 10 percent elongation.

6 Claims, 1 Drawing Sheet

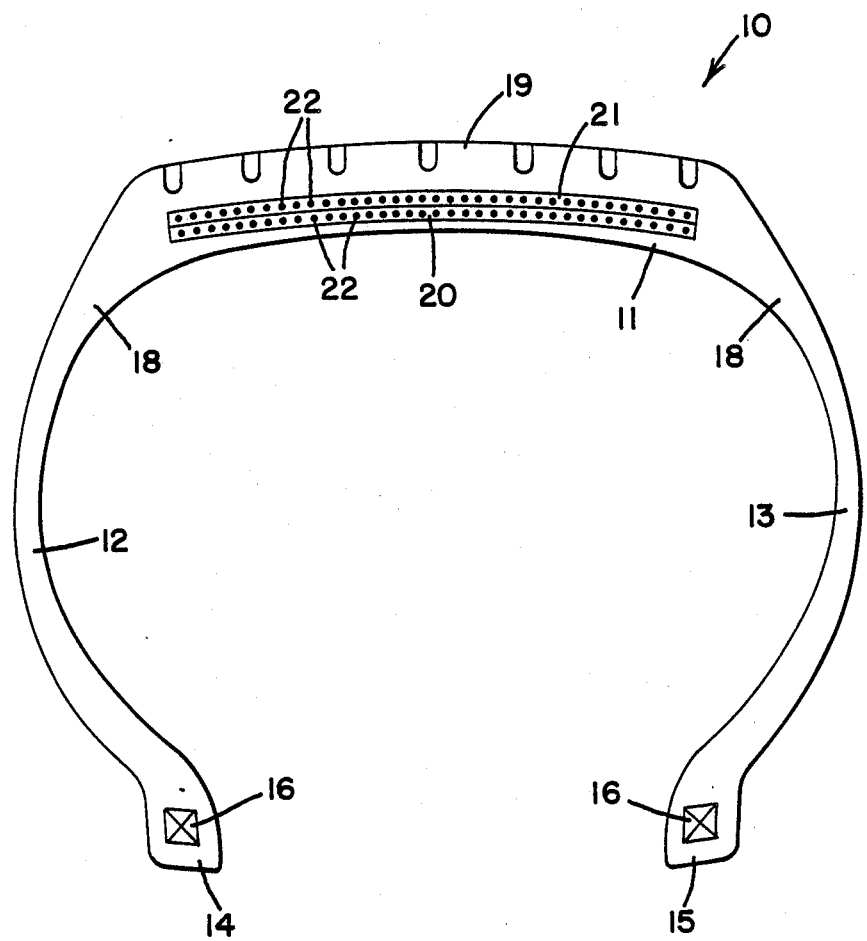

4,929,684

STIFF SIDEWALLS FOR PNEUMATIC TIRES

TECHNICAL FIELD

This invention relates to an improved sidewall construction for pneumatic tires. The sidewalls are comprised of an elastomeric material having a tensile modulus of between about 30 and 200 megapascals at an elongation of 10 percent. Tire handling characteristics are improved by using stiffer sidewalls.

BACKGROUND OF THE INVENTION

Tire sidewalls are generally constructed of very flexible, rather soft rubber stocks in order to deliver ride comfort and to protect body cords. The present invention does not alter the methods of tire building but employs instead a different, stiffer rubber stock for construction of the sidewalls. Stiffness is increased at least three times over conventional rubber stocks and up to about 200 times or more. Stiffer sidewalls as disclosed herein can be employed in substantially any tire construction, bias ply or radial, and therefore, the invention should not be construed as limited to any particular type.

The rubber from which tire sidewalls are constructed can be natural or synthetic or mixtures thereof alone or with natural rubber. The present invention employs the incorporation of compatible additives to the rubber stock to increase the stiffness. One particularly useful additive is zinc dimethacrylate.

U.S. Pat. No. 3,823,122 provides the addition of a substituted acrylic acid or acid salt to SBR synthetic rubbers to improve oil and solvent resistance. Zinc methacrylate is specifically disclosed in amounts of 2.5 to 5.0 parts per 100 or rubber (phr).

U.S. Pat. No. 4,056,269 is directed toward homogeneous golf balls comprising filled cis-polybutadiene that are highly cross-linked by a salt of divalent metals such as zinc and organic acids such as methacrylic. Amounts added are 20 to 50 phr.

U.S. Pat. No. 4,065,537 is directed toward a process for producing molded golf balls from a molded, cross-linkable elastomer. The latter comprises polybutadiene containing from about 15 to 60 parts per 100 of a salt such as zinc methacrylate.

U.S. Pat. No. 4,082,288 provides the preparation of an adjuvant from zinc oxide and methacrylic acid which is thereafter dried, ground and mixed with elastomers such as polybutadiene in amounts of 10 to 60 phr to form golf balls.

U.S. Pat. No. 4,191,671 is directed toward abrasion and fatigue resistance rubber compositions comprising a diene elastomer and 1.5 to 17 phr of an unpolymerized carboxylic acid or metal salt thereof. Carboxylic acid metal salts include higher unsaturated carboxylics and aryl carboxylics with metals such as zinc.

U.S. Pat. No. 4,192,790 provides for reducing the viscosity of synthetic and natural rubbers by incorporating basic zinc dimethacrylate-type adjuvants into the rubber at 0.1 to 7 phr, and a particulate filler.

U.S. Pat. No. 4,266,772 provides solid golf balls and compositions comprising cis-polybutadiene and 10 to 60 phr of a preformed zinc oxide-methacrylic acid reaction product in proportions of 1 to 1.5 moles of zinc oxide per mole of methacrylic acid. The reaction product is powdered to pass a 200 mesh sieve.

U.S. Pat. No. 4,495,326, owned by the Assignee of record, discloses the use of 0.2 to 15 phr of zinc dimethacrylate in a sulfur-curable rubber composition to improve processing properties in the uncured state and improved strength and dynamic properties in the cured state.

U.S. Pat. No. 4,529,770, also owned by the Assignee of record, is directed toward vulcanizable polymeric compositions comprising natural or synthetic rubber; 2.5 to 20 phr of a zinc dimethacrylate, having a surface area of 3.7 to 5.4 $m^2/g$; 30 to 70 phr of a filler and, a peroxide curing agent. These compounds exhibited improved stress-strain properties.

Thus, while the majority of the foregoing patents are directed toward golf balls, several recognize that higher modulus, higher tensile strength and greater elongation can be obtained by the addition of metal salts of unsaturated carboxylic acids to rubber. Nevertheless, in no instance have stiffer rubber stocks been employed as sidewall compositions. The art disclosed herein does not suggest such a usage, nor are pneumatic tires having stiffer sidewalls suggested thereby.

SUMMARY OF THE INVENTION

In general, a sidewall according to the present invention for the construction of pneumatic tires comprises a rubber selected from the group consisting of natural rubber, synthetic rubber and blends thereof and from about 20 to 80 parts per 100 parts of rubber of a compatible additive capable of providing a tensile modulus of elasticity of from about 30 to 200 MPa at 10 percent elongation. Improved pneumatic tires are also provided which tires have annular beads, a tread, tread reinforcing member, carcass and sidewalls. The improvement comprises employing sidewalls of the present invention having a tensile modulus of elasticity of from about 30 to 200 MPa at 10 percent elonation.

Finally, a method for improving the handling charcteristics of pneumatic tires according to the present invention includes the step of applying to the tire carcass prior to curing, sidewalls having a tensile modulus of from about 30 to 200 MPa at 10 percent elongation.

BRIEF DESCRIPTION OF THE DRAWING

The drawing FIGURE is a cross-sectional view of a pneumatic tire employing the sidewalls of the present invention.

PREFERRED MODE FOR CARRYING OUT THE INVENTION

In the manufacture of tires, a carcass or body forms the innermost layer of the tire and is usually reinforced with relatively inextensible cord members. The next layers over the carcass are the inner and outer sidewalls and the tread region, the latter comprising tread ply and reinforcing belts. The reinforced body ply usually provides a thin layer of rubber in which the reinforcing cords are embedded. Although the body ply is a strong member, abrasions to the rubber would readily and undesirably expose the cord. Thus, it has been the common practice to employ sidewall rubber plies as a protection for the underlying body ply and also for appearance.

The sidewalls have traditionally been made from rubber compositions that have a tensile modulus of elasticity of only about 2 to 8 MPa at 10 percent elongation. As stated hereinabove, the present invention provides sidewalls having much higher moduli and are therefore stiffer. The sidewalls comprise a rubber matrix and a compatible additive that increases the modulus of elasticity.

Regarding the rubber matrix, the rubber component can be natural or addition polymerized synthetic rubber such as ethylene/propylene copolymers, ethylene/propylene/diene terpolymers, neoprene, copolymers of a conjugated diene with at least one monoolefin and mixtures thereof with and without natural rubber. Natural/synthetic rubber blends can contain between about 95 to 25 percent natural rubber.

The copolymers may be derived from conjugated dienes such as 1,3-butadiene, 2-methyl-1,3-butadiene-(isoprene), 2,3-dimethyl-1,3-butadiene, 1,3-pentadiene, 1,3-hexadiene and the like, as well as mixtures of the foregoing dienes. The preferred conjugated dienes is 1,3-butadiene. Regarding the monoolefinic monomers, these include vinyl aromatic monomers such as styrene, alpha-methyl styrene, vinyl naphthalene, vinyl pyridine and the like; alkyl acrylates or methacrylates such as methyl acrylate, ethyl acrylate, butyl acrylate, methyl methacrylate, butyl methacrylate and the like; unsaturated nitriles such as acrylonitrile, methacrylonitrile and the like and vinyl halides such as vinyl chloride, vinylidene chloride and the like as well as mixtures of the foregoing monoolefins. The copolymers may contain up to 50 percent by weight of the monoolefin based upon total weight of copolymer. The preferred copolymer is a copolymer of a conjugated diene, especially butadiene, and a vinyl aromatic hydrocarbon, especially styrene.

The above-described copolymers of conjugated dienes and their method of prepartion are well known in the rubber and polymer arts. Many of the polymers and copolymers are commercially available. It is to be understood that practice of the present invention is not to be limited to any particular rubber included hereinabove or excluded. The rubber must be useful as a tire component and have a high tensile modulus. If high tensile modulus is not inherent, as is true for natural rubber, then the rubber must be one to which high tensile modulus can be imparted through compounding.

By high tensile modulus is meant that the rubber compound has a static tensile modulus ranging from about 30 MPa to 200 MPa and preferably from 50 to 100 MPa at 10 percent elongation. Most conventional rubbers and compounding stocks thereof have a static tensile modulus ranging between 4 or 5 MPa up to as high as about 10 MPa and therefore, the increase in modulus must come from compounding ingredients.

One manner in which the static tensile modulus of a natural rubber stock can be increased is by the addition of zinc dimethacrylate to the stock in an amount of from about 40 to 70 parts per 100 parts of rubber (phr). The preparation of a zinc dimethacrylate compound and its addition to a rubber polymer, e.g., natural or synthetic rubber, is described in U.S. Pat. No. 4,500,466 and U.S. Pat. No. 4,495,326, owned by the Assignee of record herein.

It is to be understood that other compounds can be added to the rubber to increase tensile modulus and that practice of the present invention is not limited to the use of zinc dimethacrylate. As a substitute, chopped cellulose fibers or styrene acrylonitrile resin can be employed in an amount of from about 0 to 10 and 0 to 30 phr, respectively, and mixtures or the two totalling up to about 30 phr.

The compounded rubber stock employed should have a tensile modulus of at least about 30 MPa. In the instance of zinc dimethacrylate and/or other dry additives, where amounts exceed about 10 phr, a reduction in carbon black can be made in compensation therefor.

As an example of suitable high modulus rubber compounds, two formulations have been provided in Table I: Compound 1 comprising 100 parts of natural rubber and Compound 2 comprising a blend of natural rubber and SBR. All parts are presented on the basis of parts per hundred rubber by weight.

TABLE 1

High Modulus Rubber Formulations Compounds 1 and 2

| | 1 | 2 |
|---|---|---|
| Natural Rubber | 100 | 25–95 |
| SBR | — | 5–75 |
| HAF Black | 0–50 | 0–50 |
| Zinc Oxide | 1–7.5 | 1–7.5 |
| Stearic Acid | 0.5–3 | 0.5–3 |
| Monsanto SAN Resin #33[1] | — | 0–30 |
| Zinc dimethacrylate | 0–80 | — |
| Chopped cellulose fibers | 0–10 | — |
| Styrene acrylonitrile resin | 0–30 | — |
| NOBS Special accelerator[2] | 0.2–4 | 0.2–4 |
| Sulfur | 2–5 | 2–5 |
| Oil | 5–15 | 5–15 |
| Santogard PVI[3] | — | 0.1–4 |

[1]Styrene-acrylonitrile resin
[2]N-oxydiethylene-2-benzothiazole-sulfenamide
[3]N-(cyclohexylthio)phthalimide In the examples which follow, a conventional natural rubber skim stock, Stock A based on Compound 1, was prepared which did not contain any additives to increase modulus above the conventional range. Similar stocks, Stocks B and C, were also compounded which differed from Stock A primarily by the addition of 70 phr of zinc dimethacrylate, or 5 phr of chopped cellulose fibers and 20 phr of styrene acrylonitrile resin, respectively.

Formulations for each stock are as follows with all parts given on the basis of parts per hundred rubber by weight.

| Compounding Ingredients | Stock A | Stock B | Stock C |
|---|---|---|---|
| Natural rubber (E grade) | 100 | 100 | 100 |
| HAF Black | 50 | — | 50 |
| Zinc dimethacrylate | — | 70 | — |
| Chopped cellulose fibers | — | — | 5 |
| Styrene acrylonitrile resin | — | — | 20 |
| Zinc Oxide | 5 | — | 5 |
| Stearic Acid | 0.5 | — | 0.5 |
| Santoflex DD[1] | 2 | — | — |
| Aliphatic Hydrocarbon Resin | 2 | — | — |
| Process Oil | 2 | — | 2 |
| NOBS Special accelerator[2] | 0.6 | — | 0.6 |
| Santoflex 13 AO[3] | 1 | — | — |
| Sulfur MB[4] | 5 | — | 5 |
| Sodium dodecyl sulfate | — | 2 | — |
| Vulcup-40KE[5] | — | 3.75 | — |
| HVA-2[6] | — | 1.5 | — |

[1]6-dodecyl-1,2-dihydro-2,2,4-trimethylquinoline
[2]N-oxydiethylene-2-benzothiazole-sulfenamide
[3]N-(1,3-dimethylbutyl)-N'-phenyl-p-phenylenediamine
[4]80/20 sulfur/naphthenic oil
[5]p and m isomers alpha, alpha'bis(t-butylperoxy)diisopropyl benzene
[6]m-phenylene bis maleimide It is to be understood that the foregoing compositions of rubber skim stocks have been presented solely to enable those skilled in the art to have at least one natural rubber skim stock with which to practice the invention. As such, the present invention is not to be limited only to these specific formulations. For greater detail regarding stocks containing a metal dimethacrylate such as zinc dimethacrylate, reference can be made to U.S. Pat. No. 4,720,526 owned by the Assignee of record, the subject matter of which is incorporated herein by reference.

Sidewalls from Stocks A, B and C were employed in a series of passenger tires which were, in turn, subjected to tests to measure the cornering coefficient which is reported hereinbelow. The cornering force is the lateral force developed by a tire which pushes a vehicle around a corner when a steer angle is introduced. The cornering coefficient is defined as the lateral force produced at one degree slip angle and 100 percent of the rated load at 24 psi (0.17 MPa) inflation pressure, divided by the rated load. A value of 1025 pounds (465 Kg) on the wheel was used for the latter. A higher coefficient is indicative of improved cornering.

With reference to the drawing figure, a typical pneumatic tire 10 is shown in section. The tire includes a body or carcass 11, sidewalls 12 and 13, beads 14 and 15, respectively and bead rings 16. The sidewalls terminate in the crown area 18 and the tread 19 is located therebetween. The tire 10 may also contain two breaker plies or belts 20 and 21 containing reinforcing elements 22 and located between the carcass and the tread. It should also be understood that a typical tire contains other components and ply elements not shown in the drawing for simplification. Thus, it will be appreciated by those skilled in the art that the sidewalls of the present invention are not intended to be incorporated with tires having only those elements presented hereinabove.

A plurality of radial passenger tires were built, cured and tested. Each contained two steel reinforced tread belt plies with 0.027 inch (0.696 mm) wire, 2+2 construction, ±68°. In Table II, control tires have been evaluated which contained belts and sidewalls manufactured from Stock A, which contained no additives according to the present invention and did not possess high tensile modulus. Modulus of Stock A was approximately 5 MPa.

TABLE II

| Cornering Coefficients for Control Tires | |
|---|---|
| Tire | Cornering Force Coefficient |
| 1 | 0.148 |
| 2 | 0.149 |
| 3 | 0.152 |

In Table III, six tires, each employing a high modulus rubber, Stock B, for the sidewalls and belts, have been reported.

TABLE III

| Cornering Force Coefficients for Tires Containing Stock B | |
|---|---|
| Tire | Cornering Force Coefficient |
| 4 | 0.170 |
| 5 | 0.173 |
| 6 | 0.165 |
| 7 | 0.168 |
| 8 | 0.171 |
| 9 | 0.166 |

By comparing the values reported in Tables II and III, it is evident that the second group of tires (4-9) possessed higher cornering force coefficients, average of 0.169, than the first group (1-3), average of 0.150, which, in turn, provides improved handling performance.

In order to demonstrate the effect of employing high modulus sidewalls in tires having conventional belts, four more tires were built and tested. Both employed the same belt construction discussed hereinabove and contained a conventional rubber skim (Stock A) in the belts. Tires 10 and 11 also contained sidewalls comprising Stock A and serve as controls, while tires 12 and 13 contained sidewalls comprising Stock B. The test results are reported in Table IV.

TABLE IV

| Cornering Coefficient for Tires With Conventional Tread Belts | |
|---|---|
| Tire | Cornering Force Coefficient |
| 10 | 0.167 |
| 11 | 0.165 |
| 12 | 0.20 |
| 13 | 0.18 |

Again, it is seen that the use of a stiffer sidewall provided improved cornering force coefficients. Although tires containing Stock C were not built and tested, similar results, as found for stock B are to be expected, because sidewalls comprising Stock C would have a higher tensile modulus.

In conclusion, it should be clear from the foregoing examples and specification disclosure that the use of rubber compositions having higher tensile modulus, measured at 10 percent elongation, for the construction of sidewalls improves the handling performance of pneumatic tires. It is to be understood that the use of high tensile modulus rubber is not limited to the natural rubber formulations containing zinc dimethacrylate exemplified herein or by the disclosure of typical rubber polymers provided herein, the examples having been provided merely to demonstrate practice of the subject invention. Those skilled in the art may readily select other high tensile modulus rubbers, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A sidewall for the construction of pneumatic tires comprising a rubber selected from the group consisting of natural rubber, addition polymerized synthetic rubber and blends thereof and from about 20 to 80 parts of zinc dimethacrylate, per 100 parts of rubber, capable of providing a tensile modulus of elasticity of from about 30 to 200 MPa at 10 percent elongation.

2. A sidewall, as set forth in claim 1, wherein said rubber is natural rubber.

3. A sidewall, as set forth in claim 1, comprising 60 parts of zinc dimethacrylate per 100 parts of rubber and wherein said rubber is natural rubber.

4. In a pneumatic tire having annular beads, a tread, tread reinforcing member, carcass and sidewalls, the improvement comprising:

employing sidewalls comprising a rubber selected from the group consisting of natural rubber, addition polymerized synthetic rubber and blends thereof and from about 20 to 80 parts of zinc dimethacrylate, per 100 parts of rubber, capable of providing a tensile modulus of elasticity of from about 30 to 200 MPa at 10 percent elongation.

5. A pneumatic tire, as set forth in claim 4, wherein said rubber is natural rubber.

6. A pneumatic tire, as set forth in claim 4, comprising 60 parts of zinc dimethacrylate per 100 parts of rubber and wherein said rubber is natural rubber.

* * * * *